(12) United States Patent
Vich

(10) Patent No.: US 10,155,481 B2
(45) Date of Patent: Dec. 18, 2018

(54) INTEGRATED FASTENER FOR PLASTIC AUTOMOTIVE COMPONENTS

(71) Applicant: Continental Automotive Systems, Inc., Auburn Hills, MI (US)

(72) Inventor: Gaetan Vich, Clarkston, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/648,965

(22) Filed: Jul. 13, 2017

(65) Prior Publication Data
US 2017/0305358 A1    Oct. 26, 2017

Related U.S. Application Data

(62) Division of application No. 14/876,326, filed on Oct. 6, 2015.

(60) Provisional application No. 62/060,650, filed on Oct. 7, 2014.

(51) Int. Cl.
| | |
|---|---|
| *B60R 11/00* | (2006.01) |
| *F16B 13/12* | (2006.01) |
| *F16B 39/22* | (2006.01) |
| *F16B 19/04* | (2006.01) |

(52) U.S. Cl.
CPC ............ *B60R 11/00* (2013.01); *F16B 13/126* (2013.01); *F16B 19/04* (2013.01); *F16B 39/22* (2013.01); *B60R 2011/0052* (2013.01); *B60R 2011/0064* (2013.01)

(58) Field of Classification Search
CPC . E03C 1/33; E03C 1/335; B60R 11/00; B60R 2011/0052; B60R 2011/0064; F16B 13/126; F16B 19/04; F16B 39/22

USPC ............... 248/214, 226.11, 231.9, 551, 553; 411/271, 30, 340, 383, 44, 45, 500, 57.1, 411/63, 80.1, 80.2; 4/633, 634, 636, 638, 4/649, 650, 660
See application file for complete search history.

(56) References Cited

U.S. PATENT DOCUMENTS

| | | | | |
|---|---|---|---|---|
| 3,832,931 | A | * | 9/1974 | Talan ................ F16B 13/126 411/56 |
| 5,409,336 | A | * | 4/1995 | Jericevich .......... A47G 25/0607 248/231.91 |
| 5,496,006 | A | * | 3/1996 | Kulka ................. F16B 5/0216 248/231.9 |

(Continued)

FOREIGN PATENT DOCUMENTS

| | | |
|---|---|---|
| DE | 3243946 A1 | 5/1884 |
| EP | 1087066 A1 | 3/2001 |
| FR | 2802332 A1 | 6/2001 |

OTHER PUBLICATIONS

European Office Search Report dated Feb. 5, 2016 for corresponding European application No. 15188745.2.

*Primary Examiner* — Muhammad Ijaz

(57) ABSTRACT

An integrated fastener comprises a component portion including a component housing surrounding a component, a linking platform molded extending from the component portion. A securing means is capable of being received within a receptacle defined by the linking platform and is designed to be received within an aperture defined by an automotive component. The securing means is capable of securing the component portion to the automotive component. The component portion, the linking platform, and the securing means are molded as one piece.

4 Claims, 4 Drawing Sheets

(56) References Cited

U.S. PATENT DOCUMENTS

| | | | | |
|---|---|---|---|---|
| 6,004,085 A * | 12/1999 | Yamamoto | ............ | F16B 13/002 411/30 |
| 6,232,772 B1 * | 5/2001 | Liatard | .................. | G01P 3/443 324/174 |
| 6,539,800 B2 * | 4/2003 | Yamashita | .............. | G01P 1/026 188/73.34 |
| 6,911,817 B2 * | 6/2005 | Clark | ...................... | B60T 8/171 324/173 |
| 7,322,249 B2 * | 1/2008 | Paddock | .................. | G01P 1/00 248/610 |
| 2002/0007675 A1 * | 1/2002 | Yamashita | .............. | G01P 1/026 73/493 |
| 2005/0194240 A1 * | 9/2005 | Stuve | ................. | B60R 21/0136 200/61.45 M |
| 2011/0043010 A1 * | 2/2011 | Diemer | .................. | B60N 2/07 297/217.3 |
| 2011/0274514 A1 * | 11/2011 | Lee | ........................ | F16B 39/24 411/368 |
| 2012/0210786 A1 * | 8/2012 | Steinbrink | ............ | H04L 1/0015 73/431 |

* cited by examiner

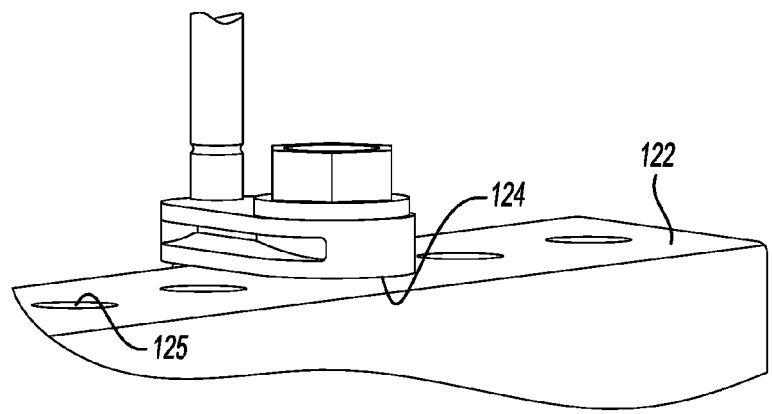
*Fig-7*
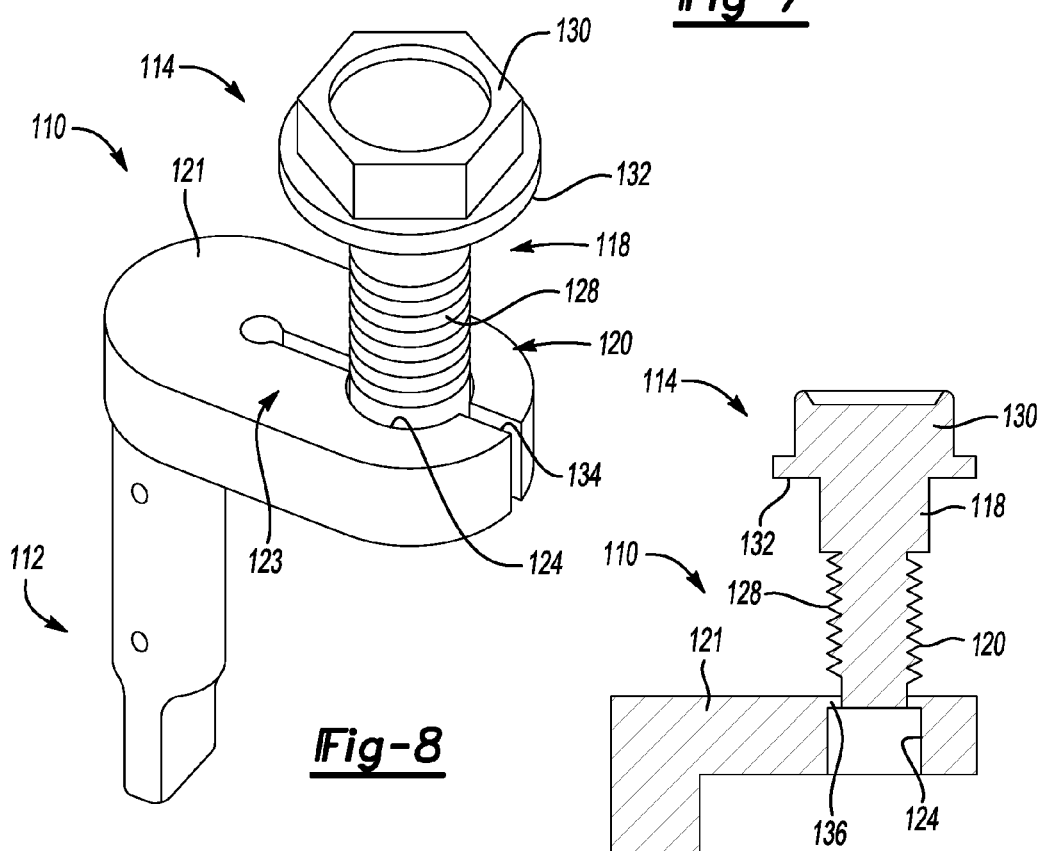
*Fig-8*
*Fig-9*

INTEGRATED FASTENER FOR PLASTIC AUTOMOTIVE COMPONENTS

CROSS REFERENCE TO RELATED APPLICATION

This application is a divisional of U.S. patent application Ser. No. 14/876,326, filed on Oct. 6, 2015, which claims priority to U.S. provisional application No. 62/060,650, filed on Oct. 7, 2014.

TECHNICAL FIELD

The present disclosure relates to fasteners for use with plastic components and more particularly to plastic components and components with plastic housings for automotive vehicles.

BACKGROUND

Automotive vehicles use many different types of components which are plastic molded parts or have plastic molded housings, which need be mounted to the vehicle. Often these plastic components are sensors, for monitoring the vehicle and/or the environment around the vehicle. The plastic components are typically attached or secured to another part of the vehicle, e.g. body panel, suspension component, frame, etc. Typically, a fastener such as a metal bolt, is used to secure the plastic component to the desired vehicle part, e.g. knuckle or engine. The plastic component commonly includes a metal insert to act as a torque limiter when tightening the bolt to avoid crushing the plastic and to prevent plastic creep causing the bolt to loosen.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An integrated fastener comprises a component portion including a component housing surrounding a component. a linking platform molded extending from the component portion. A securing means is capable of being received within a receptacle defined by the linking platform and is designed to be received within an aperture defined by an automotive component. The securing means is capable of securing the component portion to the automotive component. The component portion, the linking platform, and the securing means are molded as one piece.

A method of securing an integrated fastener to an automotive component comprises molding a securing means at least partially within a receptacle defined by a linking platform, which extends from a component portion of the integrated fastener to mold the component portion, the securing means, and the linking platform as one piece. The securing means is inserted within an aperture defined by an automotive component and secures the component portion of the integrated fastener to the automotive component.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 7 is a schematic illustration of the second embodiment of the integrated plastic component and fastener of FIGS. 5 and 6 assembled to an automotive component;

FIG. 8 is a schematic illustration of the second embodiment of the integrated plastic component and fastener of FIGS. 5-7 where the linking platform has a pressure relief groove; and FIG. 9 is a schematic partial cross-sectional view of the second embodiment of the integrated plastic component and fastener of FIGS. 5-8.

DETAILED DESCRIPTION

Figures 1, 2:
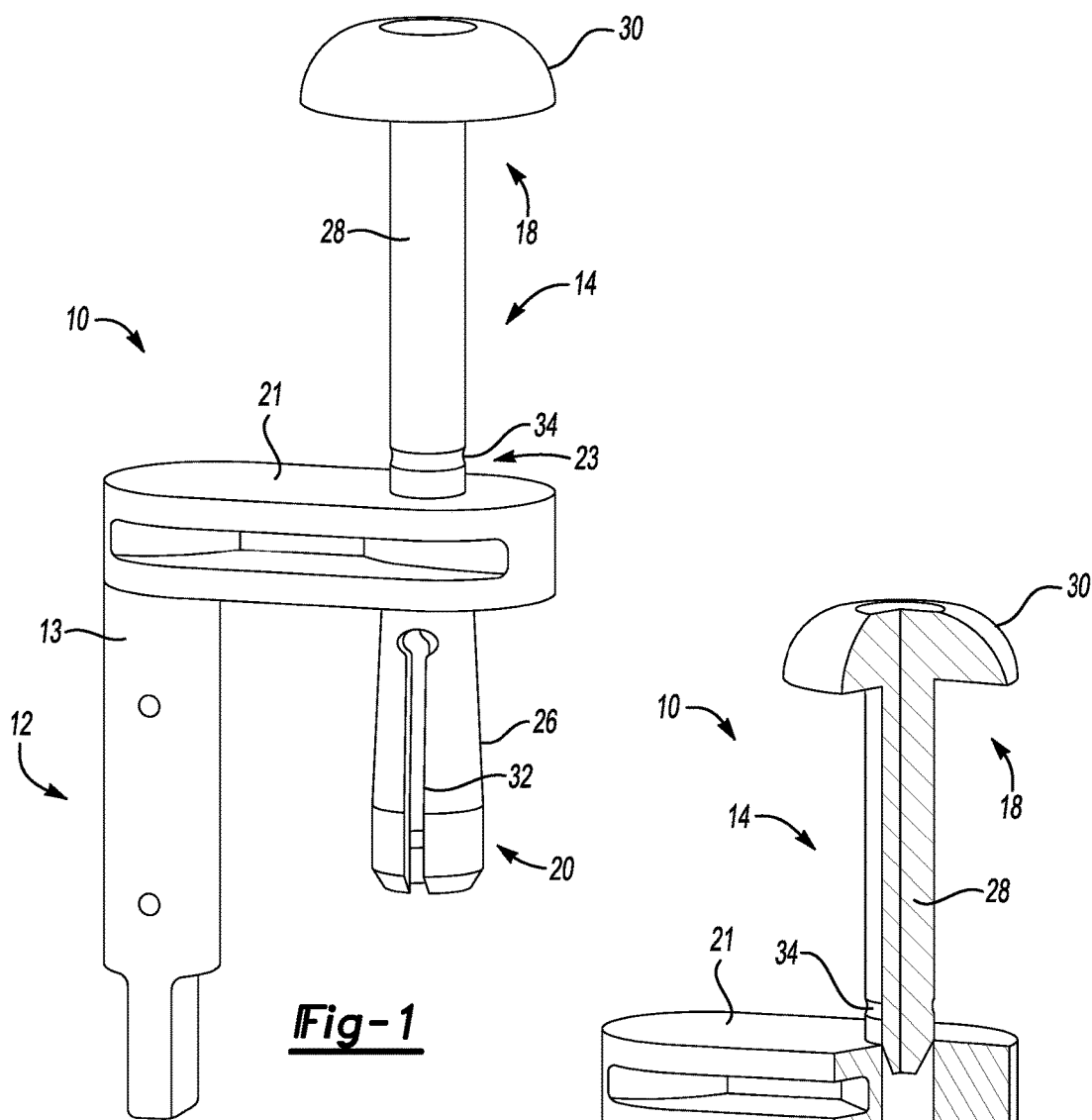
FIG. 1 is a schematic perspective illustration of a first embodiment of an integrated plastic component and fastener of the present invention.
FIG. 2 is a schematic partial cross-sectional view of the first embodiment of the integrated plastic component and fastener of FIG. 1.
Figure 3:
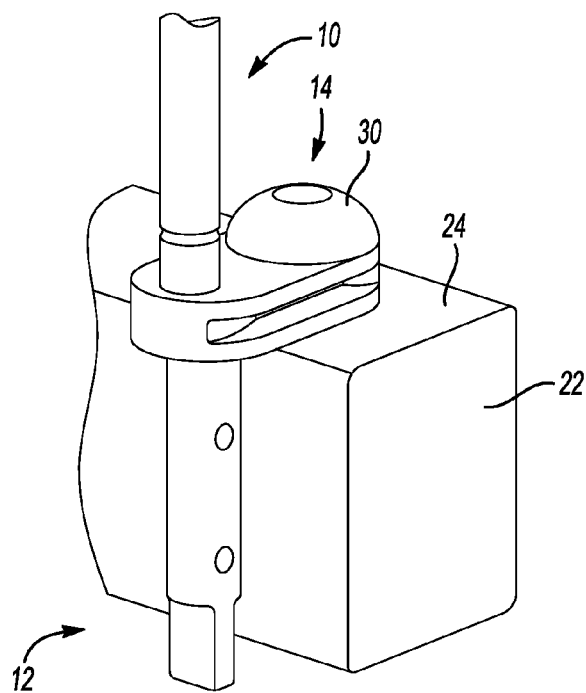
FIG. 3 is a schematic illustration of the first embodiment of the integrated plastic component and fastener of FIGS. 1 and 2 assembled to an automotive component.
Figure 4:
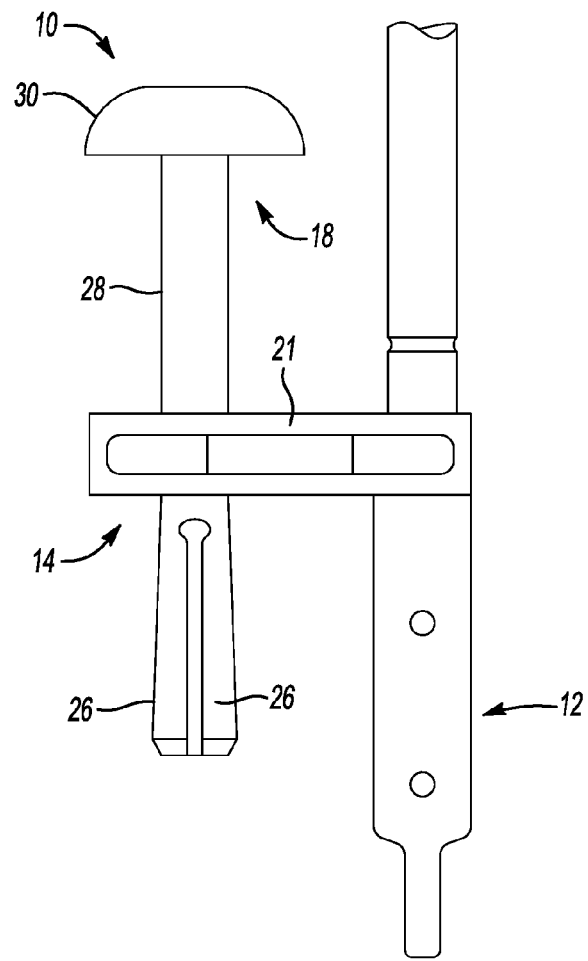
FIG. 4 is a schematic side view illustration of the first embodiment of the integrated plastic component and fastener of FIGS. 1-3.

The following description is merely exemplary in nature and is in no way intended to limit the disclosure, its application, or uses. For purposes of clarity, the same reference numbers will be used in the drawings to identify similar elements. FIGS. 1-4 illustrate a plastic automotive component that is an integrated fastener 10. The integrated fastener 10 includes a component portion 12 and a securing means 14 which are integrated together. The component portion 12 may be a plastic molded component 13, such as a sensor, or a plastic molded housing which contains a component 13. The component portion 12 and the securing means 14 are all molded at the same time using one mold and forming an integrated fastener 10.

The integrated fastener 10 eliminates the need to have a separate fastener to retain the component portion 12 to an application/vehicle (not shown). Also, because the securing means 14 is molded as once piece with the component portion 12 and both are plastic, there is no need for a torque limiter, and may not even need to use a tool to apply torque.

The securing means 14 has a first securing portion 18 extending from a first side of the linking platform 21 and a second securing portion 20 extending from a second opposing side of the linking platform 21. As explained in further detail below, the integrated fastener 10 also has a locking mechanism 23 for preventing transverse motion between the securing means 14 and the linking platform 21 once the integrated fastener is assembled to the vehicle component and the locking mechanism 23 is fully engaged.

In one embodiment, the first securing portion 18 is a push pin shaft 28 and a push pin head 30 and a second securing portion 20. The second securing portion 20 includes a plurality of leaves 26. The leaves 26 extend from the linking platform 21 and positioned to at least partially surround an axis that is parallel with the shaft 28.

An automotive component 22, to which the plastic integrated fastener 10 is to be secured, defines an aperture (not shown). The second securing portion 20 of the plastic integrated fastener 10 is inserted within the aperture. When the second securing portion 20 is inserted within the aperture the component 22 forces the leaves 26 radially inward. The push pin shaft 28 is then translated through an orifice 24 defined by the linking platform 21 to move from the first side of the platform 21 to the second side of the platform 21. As the push pin shaft 28 is translated the push pin shaft 28 forces the leaves 26 of the second securing portion 20 to expand radially outward from the axis of the shaft 28. The outward pressure of the leaves 26 on the component 22 retains the integrated fastener 10 to the component 22.

The second securing portion 20 is inserted within the orifice 24 and aperture until the linking platform 21 is seated against the automotive component 22. Once seated the first securing portion 18 is depressed until the push pin head 30 is locked in place through a locking mechanism 23. In this embodiment, the locking mechanism 23 is a tongue 32 and groove 34 arrangement on the push pin shaft 28 and the locking platform 21. The tongue 32 and groove 34 arrangement prevents the push pin head 30 from moving back to the assembly position 31. When the push pin head 30 is in the locked position 33 the leaves 26 are forced radially outward by the shaft 28 against the walls of the aperture. Thus, the integrated fastener 10 is retained to the automotive component 22.

The embodiment shown illustrates two leaves 26. There may be any number of a plurality of leaves, e.g. three, four, etc. Once skilled in the art would be able to determine the desired number, design and geometry of the leaves 26 based on the size of the integrated fastener, the component it attaching to, etc.

Figures 5, 6:
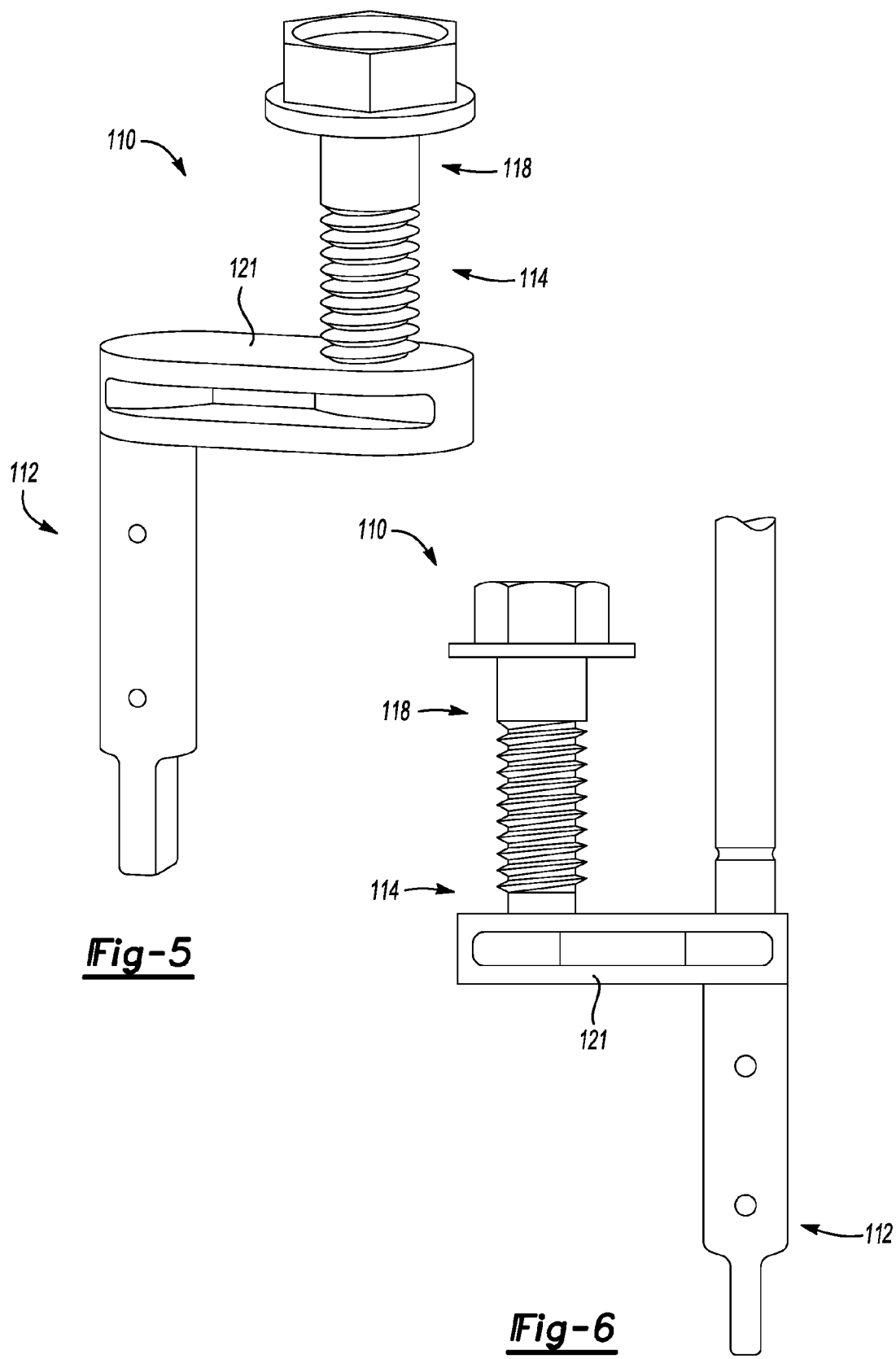
FIG. 5 is a schematic illustration of a second embodiment of an integrated plastic component and fastener of the present invention.
FIG. 6 is a schematic illustration of the second embodiment of the integrated plastic component and fastener of FIG. 5.

FIGS. 5-9 illustrate a second embodiment of an integrated fastener 110. The integrated fastener 110 includes a component portion 112 and a securing means 114 which are integrated together. The component portion 112 may be a plastic molded component 113, such as a sensor, or a plastic molded housing which contains a component 113. The integrated fastener 110 eliminates the need to have a separate fastener to retain the integrated fastener 110 to a vehicle/application (not shown). The component portion 112, including the housing, and the securing means 114 are all molded at the same time using one mold and forming an integrated fastener 110.

The integrated fastener 110 eliminates the need to have a separate fastener to retain the component portion 112 to a vehicle/application (not shown). Also, because the securing means 14 is molded as once piece with the component portion 112 and both are plastic there is no need for a torque limiter.

The securing means 114 has a first securing portion 118 extending from a first side of the linking platform 121 and a second securing portion 120 extending from a second opposing side of the linking platform 121. As explained in further detail below, the integrated fastener 110 also has a locking mechanism 123 for preventing transverse motion between the securing means 114 and the linking platform 121 once the integrated fastener is assembled to the vehicle component and the locking mechanism 123 is fully engaged.

An automotive component 122, to which the plastic integrated fastener 110 is to be secured, defines an aperture 125. The second securing portion 120 of the plastic integrated fastener 110 is inserted within the aperture 125. In this embodiment, the securing means 114 is a bolt, the first securing portion 118 is a first portion of a bolt shaft 128 and a bolt head 130. The second securing portion 120 is the remaining portion of the bolt shaft 128. The second securing portion 120 is aligned with the aperture 125. Torque is applied to the bolt head 130 to rotate the bolt 114 and tightened to move the threaded bolt shaft 128 further into the aperture 125. The bolt 114 is tightened until the plastic component 110 is seated against the automotive component 122. As the bolt 114 is tightened within the aperture 125 the rotation of the shaft 128 on the threads translates the bolt shaft 128 through the orifice 124 in the linking platform 121 to move from the first side of the platform to the second side of the platform 121. The orifice 124 may not be threaded and may have a diameter that is larger then the thread diameter on the bolt shaft 128, to allow the bolt shaft 128 to move easily through the orifice 124.

The second securing portion 120 is inserted within the aperture 25 until the linking platform 21 is seated against the automotive component 122 and until the bolt head 130 is seated on the platform 121. The securing means is locked in place through a locking mechanism 123. In this embodiment, the locking mechanism 123 is a plurality of protrusions 132 on the bolt head 130 which deform into the first side of the linking platform 121 and thereby prevent rotation of the bolt 114 relative to the linking platform 121. Thus, the integrated fastener 110 is retained to the automotive component 122. Additionally, the threaded bolt shaft 128 may be a larger diameter than the aperture 125 (and threads therein) to created an interference fit between the bolt 114 and the automotive component 122.

Referring to FIGS. 1-9, an integrated fastener 10, 110 comprises a component portion 12, 112, including a component housing, surrounding a component 13, 113. A linking platform 21, 121 is molded to extend from the component portion 12, 112. A securing means 14, 114 is capable of being received within a receptacle (not numbered) defined by the linking platform 21, 121 and is designed to be received within an aperture 25, 124 defined by an automotive component 22, 122. The securing means 14, 114 is capable of securing the component portion 12, 112 to the automotive component 22, 122. The component portion 12, 112, the linking platform 21, 121, and the securing means 14, 114 are molded as one piece.

According to the integrated fastener 10 described in the previous paragraph, in one embodiment, the securing means 14 further comprises a first securing portion 18 on a first side of the linking platform 21 and a second securing portion 20 extending through the receptacle 25 to a second opposing side of the platform 21, wherein the second securing portion 20 is inserted through the aperture until the platform 21 is seated against the automotive component 22. A shaft 28 of the second securing portion 20 forces leaves 26 which extend from the linking platform 21 and at least partially radially surround the shaft 28 to expand radially outward when the push pin portion 18 is depressed until a push pin head 30 is locked in place through a tongue and groove arrangement 32.

In one embodiment, there are two leaves 26 on the integrated fastener 10.

According to the integrated fastener 10, 110 described in above, in one embodiment, the component 13, 113 is a sensor.

According to the integrated fastener 110 described in above, in one embodiment, the securing means 114 further comprises a first securing portion 118 extending through the receptacle 125 of the platform 121. The first securing portion 118 is a bolt head 130 and part of a bolt shaft 128 and a second securing portion 120 extending through the receptacle 125 to a second opposing side of the platform 121. The second securing portion 120 is the remaining bolt shaft 128. The bolt shaft 128 is threaded within the aperture 125 until the platform 121 is seated against the automotive component 122 and the bolt head 130 is seated to the platform 121.

In one embodiment, the bolt 114 has a locking mechanism 123 to prevent rotation relative to the platform 121, once the bolt head 130 has been fully seated against the platform 121. Referring to FIG. 8 in one embodiment the locking mechanism 123 may include a pressure relief groove 134. An interference fit between the bolt 114 and the linking platform 121 may exist. The pressure relief groove 134 allows the platform 121 to expand outward as the bolt is moved through the orifice 124 and threaded into aperture 125. However, while the pressure relief groove 134 allowed the linking platform 121 to expand, the linking platform is still applying a clamping pressure on the bolt shaft 128.

In another embodiment, the locking mechanism 123 is protrusions 132 on the bolt head 130 that deform and engage the linking platform 121 to prevent rotation of the bolt 114 relative to the platform 121, thus preventing transverse movement between the securing means 114 and the linking platform 121, once the bolt head 130 has been fully seated against the platform 121.

A method of securing an integrated fastener 10, 110 to an automotive component 22, 122 comprises molding a securing means 14, 114 at least partially within a receptacle 25, 125 defined by a linking platform 21, 121, which extends from a component portion 12, 112 of the integrated fastener 10, 110 to mold the component portion 12, 112, the securing means 14, 114, and the linking platform 21, 121 as one piece. The securing means 14, 114 is inserted within an aperture 25, 124 defined by an automotive component 22, 122 and secures the component portion 12, 112 of the integrated fastener 10, 110 to the automotive component 22, 122.

According to the method described in the previous paragraph, in one embodiment, inserting the securing means 14, 114 within the aperture 25, 124 further comprises applying a force to a first portion 18, 118 of the securing means 14, 114 to move the securing means 14, 114 relative to the linking platform 21, 121, wherein the relative movement breaks at least one molded connection 36, 136 between the securing means 14, 114 and the linking platform 21, 121 such that a second portion 20, 120 of the securing means 14, 114 is moved further within the receptacle 24, 124.

According to the method described above, in one embodiment, transverse movement of the securing means 14, 114 relative to the linking platform 21, 121 is prevented with a locking mechanism 23, 123.

According to the method described above, in one embodiment, inserting the second portion 20 of the securing means 14 within the aperture 25 until the platform 21 is seated against the automotive component 22 and depressing the first securing portion 18 until a push pin head 30 on the first securing portion 18 is locked in place through the locking mechanism 23. Leaves 26 on the second securing portion 20 are thereby forced to expand radially outward from the shaft 28 when the locking mechanism 23 is locked in place to retain the integrated fastener 10 to the automotive component 20.

According to the method described above, in one embodiment, the locking mechanism is a tongue and groove arrangement.

According to the method described above, in one embodiment, inserting the second portion 120 of the securing means 114 within an aperture 125 defined by the automotive component 122 includes where the first and second portions 118 and 120 are a bolt shaft 128 that is threaded within the aperture 125 until the linking platform 121 is seated against the automotive component 121 and a bolt head 130 is also seated on the linking platform 121.

According to the method described above, in one embodiment, the locking mechanism is protrusions 132 on the bolt head 130 that deform and engage the linking platform 121 to prevent rotation relative to the platform 121, thus preventing transverse movement between the securing means 114 and the linking platform 121, once the bolt head 130 has been fully seated against the platform 121.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of securing an integrated fastener to an automotive component comprising:
   providing a securing means having a linking platform which extends from a component portion of the integrated fastener and wherein the component portion, the securing means, and the linking platform are molded as one piece;
   inserting the securing means within an aperture defined by an automotive component;
   securing the component portion of the integrated fastener to the automotive component with the securing means;
   wherein inserting the securing means within the aperture further comprises applying a force to a first portion of the securing means to move the securing means relative to the linking platform, wherein the relative movement breaks at least one molded connection between the securing means and the linking platform such that a second portion of the securing means is received further within the receptacle;
   preventing transverse movement of the securing means relative to the linking platform through a locking mechanism; and
   inserting the second portion of the securing means within an aperture defined by the automotive component, wherein the first and second portions is a bolt shaft that is threaded within the aperture until the linking platform is seated against the automotive component and a bolt head is also seated on the linking platform;
   wherein the locking mechanism is protrusions on the bolt head that deform and engage the linking platform to prevent rotation relative to the platform, thus preventing transverse movement between the securing means and the linking platform, once the bolt head has been fully seated against the platform.

2. The method of claim 1, wherein the locking mechanism is an interference fit between the bolt shaft and the linking platform.

3. The method of claim 2, wherein the linking platform defines a pressure relief groove that provides a spring pressure on the bolt shaft when the bolt has been threaded into the aperture.

4. A method of securing an integrated fastener to an automotive component comprising:
- providing a securing means having a linking platform which extends from a component portion of the integrated fastener and wherein the component portion, the securing means, and the linking platform are molded as one piece;
- inserting the securing means within an aperture defined by an automotive component;
- securing the component portion of the integrated fastener to the automotive component with the securing means;
- wherein inserting the securing means within the aperture further comprises applying a force to a first portion of the securing means to move the securing means relative to the linking platform, wherein the relative movement breaks at least one molded connection between the securing means and the linking platform such that a second portion of the securing means is received further within the receptacle;
- preventing transverse movement of the securing means relative to the linking platform through a locking mechanism; and
- inserting the second portion of the securing means within an aperture defined by the automotive component, wherein the first and second portions is a bolt shaft that is threaded within the aperture until the linking platform is seated against the automotive component and a bolt head is also seated on the linking platform;
- wherein the locking mechanism is an interference fit between the bolt shaft and the linking platform; and
- wherein the linking platform defines a pressure relief groove that provides a spring pressure on the bolt shaft when the bolt has been threaded into the aperture.

* * * * *